United States Patent [19]

Proud et al.

[11] Patent Number: 4,593,397
[45] Date of Patent: Jun. 3, 1986

[54] ELECTRODELESS SHORT PULSE LASER

[75] Inventors: Joseph M. Proud, Wellesley Hills; Donald H. Baird, Newton; Jerry M. Kramer, Acton, all of Mass.; Joseph E. Lester, Gibsonia, Pa.

[73] Assignee: GTE Laboratories Incorporated, Waltham, Mass.

[21] Appl. No.: 20,576

[22] Filed: Mar. 15, 1979

[51] Int. Cl.[4] .............................................. H01S 3/097
[52] U.S. Cl. ........................................ 372/82; 372/92; 372/87
[58] Field of Search .................. 331/94.5 G, 94.5 P, 331/94.5 PE, 94.5 D

[56] References Cited

U.S. PATENT DOCUMENTS

| 3,183,937 | 5/1965 | Earley et al. | 138/89 |
| 3,390,351 | 6/1968 | Bell | 331/94.5 |
| 3,393,372 | 7/1968 | Vickery et al. | |
| 3,460,053 | 8/1969 | Leonard | |
| 3,470,493 | 9/1969 | Altman et al. | 331/94.5 PE |
| 3,588,740 | 6/1971 | Bell | 331/94.5 PE |
| 3,602,837 | 8/1971 | Goldsborough | 331/94.5 P |
| 3,614,653 | 10/1971 | Javan et al. | 331/94.5 G |
| 3,679,997 | 7/1972 | Friedl et al. | 331/94.5 |
| 3,686,584 | 8/1972 | Wahl | 331/94.5 |
| 3,720,877 | 3/1973 | Zarowin | 331/94.5 G |
| 3,934,211 | 1/1976 | Sucov et al. | 331/94.5 G |
| 3,936,772 | 1/1976 | Sucov et al. | 331/94.5 G |

OTHER PUBLICATIONS

"Mercurie Bromide Dissociation Laser in an Electric Discharge" by Schimitschek et al.; Optics Lett., vol. 2, No. 3, (1978).

"Electrodeless High-Frequency Pulsed Discharge in Inert Gases" by Andreev et al.; Soviet Physics-Technical Papers vol. 14, No. 6, (Dec. '69).

"Superradiant Emission at 5106, 5700 and 5782 Å in Pulsed Copperlodde Discharges" by Weaver et al.; Jour. Quant Elect., vol. QE-10, No. 2, Feb. 74.

Primary Examiner—Leon Scott, Jr.
Attorney, Agent, or Firm—Fred Fisher

[57] ABSTRACT

A laser device with a discharge tube forming a closed envelope with cylindrical end portions connected by an elongated constricted center portion and having external electrodes at the end portions, fed from a source of short pulses with a width measured in nanoseconds, capacity coupled to the discharge plasma. The discharge plasma may include metal vapor, a metal halide, including mercury halide, and internal electrodes may be included in the closed envelope but coupled to the external electrodes by capacity coupling so as to avoid any connections from electrodes passing through the glass or fused silica envelope.

3 Claims, 4 Drawing Figures

ELECTRODELESS SHORT PULSE LASER

BACKGROUND OF THE INVENTION

The present invention relates to lasers and, more particularly, to lasers using a metal vapor or metal halide, including mercury halide, as the lasing medium in requiring short pulsed excitation.

When it was desired to apply short, high voltage pulses to an electroded, coaxial discharge laser to attempt to achieve high efficiency, certain problems were noted. A troublesome problem in the use of metal vapor in lasers lies in the high temperature required to develop sufficient metal vapor pressure, e.g. 1500° C. for copper. It is known from an article by L. A. Weaver and E. W. Sucov in *IEEE J. Quantum Electron,* Volume QE-10 (1974), entitled "Superradiant Emission at 5106,5700, and 5782 Å in Pulsed Copper Iodide Discharges", that sources of metallic vapor may also be derived from certain metal halides, such as copper iodide, where appropriate vapor pressure can be achieved at temperatures as low as 600° C. That lasing occurs in such vapors is known, but, in practice, the laser vapor is chemically unstable. Pumping on the laser to remove gaseous impurities results in loss of halogen and, hence, in deposition of the metal component on cold walls. Other problems in such systems involve chemical reaction and subsequent erosion of electrode material and difficulty in providing seals between the envelope material (typically, fused silica or refractory envelope material) and the electrode connections.

In order to seal the tube and to maintain the required pressure of metal halides for laser pulse generation, it is necessary that the fill chemistry be such that metal halide is regenerated from the metal and halide atoms or molecules generated in the discharge. It is further necessary that a metal atom scavenging chemistry exist in the tube in order to prevent metal deposition on the cooler sections of the tube. The free energy of formation of copper iodide is negative at the temperatures of interest and, therefore, the kinetics of formation of CuI(s) from $Cu(s)+I_2(g)$ should be favorable and copper metal should be unstable with respect to copper halide at the walls. If necessary, a slight excess of free halogen can be introduced into the laser tube prior to sealing to drive the reaction toward copper halide at the walls of the tube.

The above discussion applies to metal halide systems in which it is desired to achieve the free metal as the lasant. However, in certain situations, such as when using mercury halides, the mercury monohalide is the lasant in the molecular state.

SUMMARY OF THE INVENTION

An object of the present invention is to provide a new and improved means for operating a short pulse laser, where the lasing medium is either a metal vapor or a metal halide (which may include mercury halide) which does not require metallic electrodes in contact with the gas discharge, thus subjecting them to chemical attack.

Another object of the invention is to provide a new and improved relatively low temperature chemically stable source of metallic vapor through the utilization of metal halide in a sealed, electrodeless system.

Still another object of the present invention is to provide a new and improved laser utilizing capacity coupling to the internal volume of the discharge, thereby passing the useful, high frequency components of a baseband driving pulse, while rejecting only a portion of the pulse energy.

A further object of the present invention is to provide a new and improved laser construction which avoids the mechanical problem of forming a metal-glass or metal-fused silica seal for the electrodes within an envelope.

The overall structure of the present invention presents further advantages: pumping and other gas handling are eliminated by use of a closed system; lower operating temperatures greatly reduce heating and cooling requirements, as compared to pure metallic systems.

Furthermore, the overall system efficiency is greatly improved. The laser of the present invention has greatly improved operating life over conventional prior art devices.

BRIEF DESCRIPTION OF THE DRAWINGS

Other objects and advantages will be apparent from a detailed description of the invention, when read in conjunction with the accompanying drawings, wherein.

DESCRIPTION OF THE PREFERRED EMBODIMENTS

The inventors have found that sealed, electrodeless discharge tubes, driven from a high power microwave source, exhibit atomic metal spectral lines associated with laser action when filled with a metal halide, such as copper iodide, and neon gas at a background pressure of about 10–20 torr. Moreover, they have found that average power dissipation in the order of 100 watts is sufficient to maintain envelope temperatures approaching 600° C.

Figure 1:
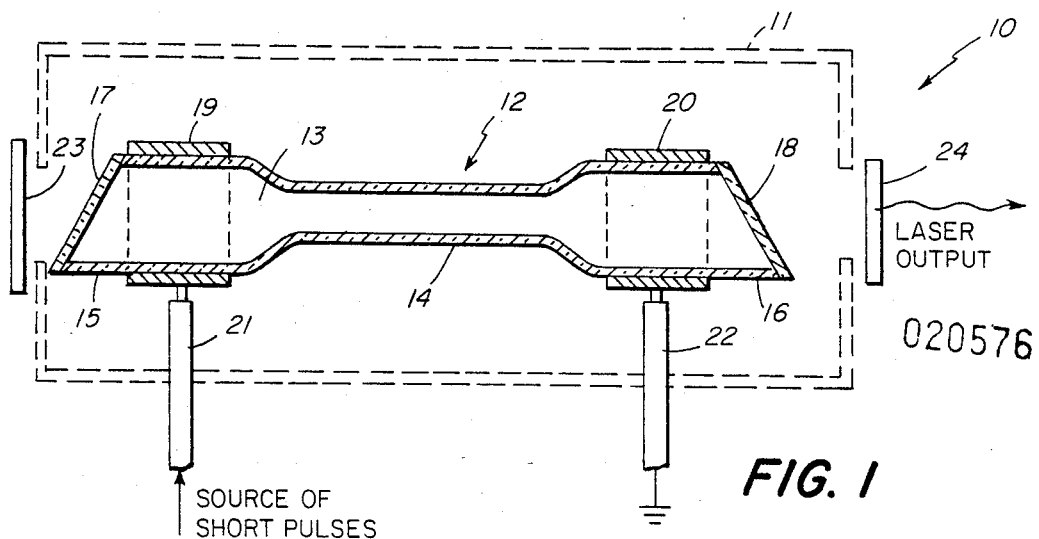
FIG. 1 is a schematic diagram of a laser incorporating an embodiment of the laser discharge tube of the present invention.

Certain provisions for laser discharges are illustrated in FIG. 1 by a schematic diagram of a laser device 10 with surrounding mesh 11 at ground potential, having a discharge tube 12, containing discharge plasma 13, within its confines. The discharge tube 12 has, as shown, a constricted portion 14 connecting enlarged end portions 15 and 16. The outer ends of both end portions 15 and 16 are sealed by laser windows 17 and 18, respectively, thereby forming a closed sealed envelope and closed system for the discharge plasma 13. Because of this closed system, no pumping is necessary. External electrodes 19 and 20 surround end portions 15 and 16, respectively, and are connected to coaxial cables 21 and 22, respectively. The coaxial cable 21 is connected to a source of short pulses and the coaxial cable 22 is connected to ground. A mirror 23 and an output coupling mirror 24 complete the device 10 in their positions along a longitudinal axis in the optical path of the tube 12 in line with and near the ends with windows 17 and 18. Laser output, thus is through the mirror 24 in the present illustration. However, in superradiant lasers, the mirror 24 is unnecessary and output, then, is through the window 18.

Figure 2:
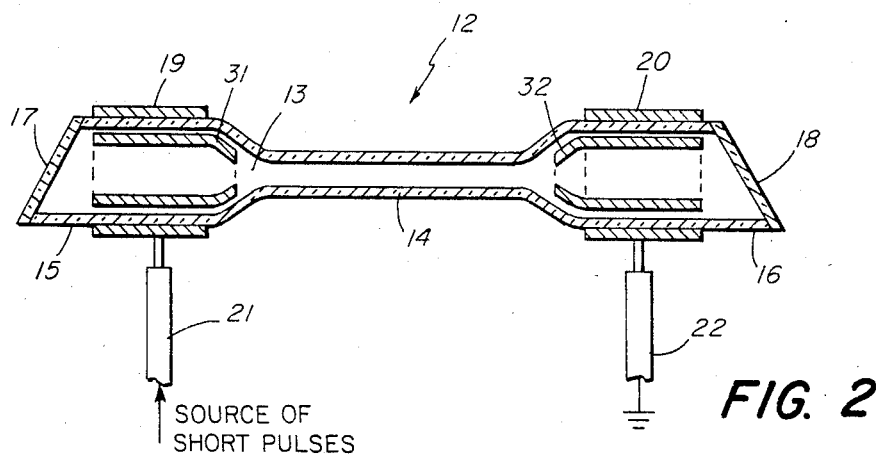
FIG. 2 is another embodiment of a laser tube of the present invention.

The form of the discharge volume must be a slender cylinder as depicted by the discharge tube 12 in order to achieve sufficient optical path for adequate optical gain and rapid interpulse recovery by depopulation of any metastable species through collision with the walls of the discharge tube 12. Such tube is used in the laser device 10 to provide microwave coupling to an elongated cylindrical discharge tube. In general, means for coupling microwaves to an elongated cylindrical discharge tube is known. However, the provisions necessary for laser discharges, as illustrated in FIGS. 1 and 2 differ from such generally known coupling means. These provisions in the illustrated embodiments involve, primarily, the establishment of an axial optical path by the means shown so that the laser pulse can be extracted. Since the oscillation time in metal vapor and some metal halide lasers is only a few nanoseconds, it is required that the microwave power be supplied in high power, short pulse bursts. Peak power levels in the megawatt range are appropriate. Typically, the pulse repetition rate is up to $10^5$ Hz and the pulse width is on the order of $10^{-8}$ seconds or less.

This present invention takes advantage of the fact that short pulses are required in metal vapor and some metal halide lasers. It is known that narrow, base-band (non-oscillating) pulses contain frequency components from zero to relatively high frequency, depending upon the pulse width. For example, a rectangular voltage pulse of width W exhibits a relative power spectrum $P_r$ given by:

$$P_r(f) \alpha \sin^2 \pi f W/(fW) \qquad (1)$$

where f is the frequency. The spectrum width is of the order:

$$f \approx W^{-1} \qquad (2)$$

and roughly one-half of the energy within the pulse resides at a frequency above $f_{\frac{1}{2}}$, where:

$$f_{\frac{1}{2}} \approx (2W)^{-1} \qquad (3)$$

Figure 3A:
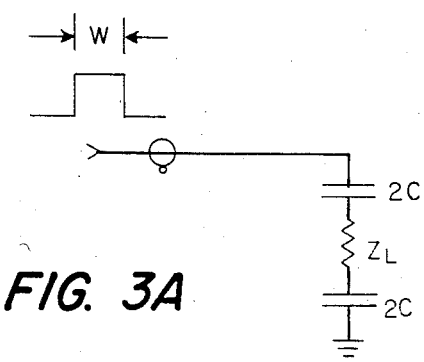
FIGS. 3A and 3B are illustrations of equivalent capacity coupled pulse circuits used in the present invention.
Figure 3B:
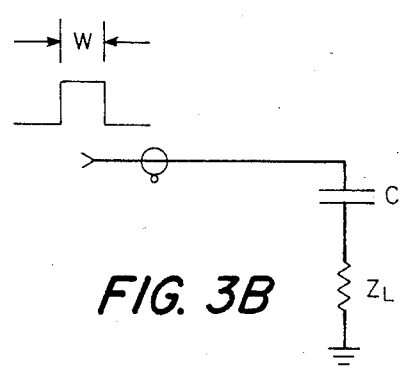

Such pulses, which are relatively easily generated by transmission line technique, can be connected capacitively to a load impedance $Z_L$, as in the equivalent circuits of FIGS. 3A and 3B. It can be shown, for example, that more than one-half of the rectangular pulse energy is passed to $Z_L$ if $Z_L$ matches the source impedance $Z_o$ and $$C \geq (0.31 W/Z_o) \qquad (4)$$

In metal vapor and some metal halide lasers, it is typical to use pulses as narrow as $5 \times 10^{-9}$ sec. in transmission line circuits having a characteristic impedance of 50 ohms. Then, for relatively efficient energy transmission to the laser discharge, a capacitance of approximately 30 picofarads or greater suffices.

Capacity coupling to the discharge volume of a short pulse vapor laser can be accomplished according to the means illustrated in the embodiments illustrated in FIGS. 1 and 2, wherein similar numbers depict similar elements. Typically, the laser discharges along paths through constricted portions 14, although in some cases these constricted portions are not necessary. In FIG. 2, internal electrodes 31 and 32 are placed within enlarged portions 15 and 16, respectively, without any connections passing through the envelope formed by the discharge tube 12. Thus in FIG. 2, capacity coupling to the plasma 13, which is $Z_L$ in the circuits of FIGS. 3A–3B, occurs between external electrodes 19, 20 and internal electrodes 31, 32, respectively, through the nonconducting wall of portions 15 and 16 composing the envelope of the discharge tube 12. The advantage of this geometry lies primarily in the elimination of glass-metal or fused silica-metal seals, while the internal electrodes are present to define the origin of the discharge and the establish an axial optical path. Inner electrodes permit the use of different electrode materials, since the matching of metal and envelope expansion coefficients is not required.

Another approach is that illustrated in FIG. 1. In that case, inner electrodes are not used so that the ionized and conducting vapor of plasma 13 within the tube end portions 15 and 16 forms a virtual electrode coupled capacitively through the walls of the envelope to external electrodes 19 and 20. It is possible to couple short pulse energy to the discharge plasma 13 within an envelope of the type illustrated with an efficiency equal to that previously attained in electroded devices, including those with connections which pass through the envelope as in the prior art. Moreover, a very uniform discharge occurs and the non-conducting envelope material of glass or fused silica is not adversely affected by the ionized charge carriers. This occurs since charge is carried primarily by electrons in this short time domain and field accelerated ion bombardment of tube walls is minimal. Also in this embodiment of FIG. 1, an the additional advantage is obtained, wherein there are no electrodes within the envelope to wear out or to contaminate the plasma system.

The preferred form of coupling has been described as capacity coupling, but certain advantages described above can be obtained through other coupling which eliminates the passing of metal through the envelope containing the plasma. Such other coupling may be by inductive coupling and therefore the present invention is not considered limited by the specific preferred embodiments.

Also, an advantage is the elimination of pumping because of the use of a closed system in the preferred embodiments illustrated. It is within the breadth of this invention to use the coupling system described with a pump connected laser.

It will be obvious to those skilled in the art that various changes may be made without departing from the scope of the invention. The invention is not considered limited to what is shown in the drawings and described in the specification.

We claim:

1. In a system for the generation of coherent beams of radiation, a combination comprising a tube defining a resonant cavity containing a discharge plasma capable of producing coherent radiation, said tube having an elongated shape along an optical axis along the longitudinal axis of said tube, said tube having end portions and an elongated constricted portion connecting said end portions, and said tube having laser windows sealing said end portions to form a closed envelope containing said discharge plasma, a mirror on said optical axis near at least one end of said tube, first and second external electrode means on the outside surfaces of said tube adjacent the opposite ends of said tube, said external electrode means being capacitively coupled to said discharge plasma, and means for providing a source of short pulses electrically to said first external electrode means and means for coupling said second external electrode means to a point of reference potential, further characterized by first and second internal electrode means respectively adjacent said first and second external electrode means and capacitively coupled thereto, said tube having end portions sealed to form a closed envelope containing said discharge plasma and said internal electrode means.

2. In a system for the generation of coherent beams of radiation, a combination comprising a tube defining a resonant cavity containing a discharge plasma capable of producing coherent radiation, said tube having an elongated shape along an optical axis along the longitudinal axis of said tube, said tube having end portions and an elongated constricted portion connecting said end portions, and said tube having laser windows sealing said end portions to form a closed envelope containing said discharge plasma, a mirror on said optical axis near at least one end of said tube, first and second external electrode means on the outside surfaces of said tube adjacent the opposite ends of said tube, said external electrode means being capacitively coupled to said discharge plasma, and means for providing a source of short pulses electrically to said first external electrode means and means for coupling said second external electrode means to a point of reference potential, further characterized by pulses from said source of short pulses having a pulse width on the order of $10^{-8}$ seconds or less.

3. In a system for the generation of coherent beams of radiation, a combination comprising a tube defining a resonant cavity containing a discharge plasma capable of producing coherent radiation, said tube having an elongated shape along an optical axis along the longitudinal axis of said tube, said tube having end portions and an elongated constricted portion connecting said end portions, and said tube having laser windows sealing said end portions to form a closed envelope containing said discharge plasma, a mirror on said optical axis near at least one end of said tube, first and second external electrode means on the outside surfaces of said tube adjacent the opposite ends of said tube, said external electrode means being capacitively coupled to said discharge plasma, and means for providing a source of short pulses electrically to said first external electrode means and means for coupling said second external electrode means to a point or reference potential, further characterized by first and second internal electrode means respectively adjacent said first and second external electrode means and being capacitively coupled thereto, and said discharge plasma including a metal halide.

* * * * *